United States Patent [19]
Warkentin

[11] 3,937,933
[45] Feb. 10, 1976

[54] SYSTEM AND METHOD FOR REDUCING THE PULSE REPETITION RATE IN AN ELECTRONIC TAXI METER

[75] Inventor: Ulrich Warkentin, Tannheim, Germany

[73] Assignee: Kienzle Apparate GmbH, Villingen, Germany

[22] Filed: Dec. 3, 1974

[21] Appl. No.: 528,820

[30] Foreign Application Priority Data
Dec. 5, 1973 Germany............................ 2360587

[52] U.S. Cl................ 235/150.3; 235/30 R; 235/45; 235/156
[51] Int. Cl.².................... G07B 13/10; G06F 15/20
[58] Field of Search ........ 235/150.3, 156, 168, 152, 235/30 R, 45, 92 TC, 151.32; 328/39, 159, 140; 307/225 R, 271

[56] References Cited
UNITED STATES PATENTS

| | | | |
|---|---|---|---|
| 2,892,933 | 6/1959 | Shaw............................ | 235/150.3 X |
| 2,913,179 | 11/1959 | Gordon............................ | 235/150.3 |
| 3,388,859 | 6/1968 | Kelch et al....................... | 235/30 R |
| 3,703,985 | 11/1972 | Berg................................ | 235/45 X |
| 3,818,186 | 6/1974 | Harwood ......................... | 235/45 X |

*Primary Examiner*—Joseph F. Ruggiero
*Attorney, Agent, or Firm*—Michael J. Striker

[57] ABSTRACT

The taxi meter receives a sequence of pulses each representing a determined distance travelled by the taxi. The repetition rate of the input pulses is to be reduced by a ratio T so that each pulse having the reduced repetition rate signifies a determined fare increment. An adder or counter has a determined capacity and furnishes a carry signal whenever the sum signal created therein exceeds that capacity. An addend equal to K/T where K is the capacity of the adder is applied to the input of the adder for addition therein in response to each of the input pulses. The carry signals furnished by the adder constitute the desired signals each signifying the correct fare increment. The repetition rate of pulses each signifying a unit of waiting time can be similarly reduced and the resulting carry pulse sequences be applied to a selection circuit which selects the one having the highest repetition rate to constitute the tariff signal, namely the signals for advancing the taxi meter by one fare increment.

3 Claims, 2 Drawing Figures

SYSTEM AND METHOD FOR REDUCING THE PULSE REPETITION RATE IN AN ELECTRONIC TAXI METER

BACKGROUND OF THE INVENTION

This invention relates to electronic taxi meters and in particular to a method and system for reducing the repetition rate of pulses signifying either increments of distance travelled or units of waiting time in such a manner that each pulse in the pulse sequence having the reduced repetition rate signifies a determined fare increment. The system and method is to be applicable both to integral and non-integral reduction ratios.

Electronic taxi meters are known and are disclosed, for example, in application Ser. No. 323,907, filed on January, 1973 the claims of which have been allowed. In such taxi meters a first and second pulse sequence is furnished, the pulses in each sequence signifying, respectively, increments of distance travelled and units of waiting time. In these known taxi meters a selection circuit is furnished which selects the pulse sequence having the higher repetition rate for purpose of advancing the taxi meter by a given fare increment. In order that the selection circuits operate as accurately as possible, high repetition rates for the input pulses are desirable. The higher the repetition rate the more exact the switching of the selection from the distance increment to the unit time pulses and vice versa. In known taxi meters of this type, the relatively high frequency pulses at the output of the selection circuits are then applied to a binary reduction stage or the like so that the output pulses of this binary reduction stage then constitute the tariff pulses, that is the pulses each of which causes the taxi meter to be advanced by a fare increment.

A further requirement for the conventional taxi meters of the type described above is that the two pulse sequences applied to the input of the selection circuit must be of sufficiently low frequency that the selection circuit can process the pulses without distortion. The highest allowable frequency of course depends upon the particular electronic building blocks used. However, in any case, the speed of the taxi must be considered to be able to vary between zero and 140 kilometers per hour. If the input pulse frequency or repetition rate is such that one pulse is generated per 0.1 m distance travelled, then the frequency or repetition rate of the pulses each of which signify distance travelled is variable between 0 and approximately 400 pulses per second. If this frequency is again increased by a factor of 10 which of course is possible, then one pulse would be generated per 0.01 meters of distance travelled. Under this condition the selection circuit would have to be able to process pulses having a frequency between 0 and 4,000 pulses per second. This is not always readily accomplished with electronic building blocks and especially is difficult to accomplish with highly integrated circuit building blocks.

On the other hand it must be considered that the pulses at the output of the selection circuit already constitute a measure of the fare. In other words, each pulse at the output of the selection circuit represents a determined fare increment. Since the fare rate for the time and the distance travelled may differ widely, the reduction in the pulse repetition rate must take place individually for the distance and the time pulses and the reduction must be carried out prior to and not following the selection circuit.

If it is now assumed that after the selection circuit a further repetition rate reduction of 100:1 takes place (as is the case in the taxi meter described in the above-mentioned U.S. application) then the reduction ratios given in the following Table must exist for the corresponding values also listed in this Table:

| Case I: | Distance per Fare Increment | Reduction Ratio |
|---|---|---|
| Fare rate 1 | 50 m = 500 pulses | 5:1 |
| Fare rate 2 | 35 m = 350 pulses | 3.5:1 |
| Fare rate 3 | 20 m = 200 pulses | 2:1 |
| Case II: | | |
| Fare rate 1 | 15 m = 150 pulses | 1.5:1 |
| Fare rate 2 | 12.5 m = 125 pulses | 1.25:1 |
| Fare rate 3 | 10 m = 100 pulses | 1:1 |

The above Table of course constitutes the reduction ratios as applied to the distance increment pulses. For the unit time pulses and the corresponding fare rates, non-integral reduction ratios may also be required. For the usual type of resettable binary reduction stage, the implementation of such non-integral reduction ratios is particularly difficult. In particular it is impossible to implement such non-integral reduction ratios with sufficient accuracy.

SUMMARY OF THE INVENTION

It is an object of the present invention to implement reduction ratios including non-integral reduction ratios in the number of tariff pulses corresponding to fare increments with respect to the number of input pulses corresponding to distance increments travelled or units of waiting time with the maximum possible accuracy. In the present invention, a plurality of tariff signals are created, each representing a determined fare increment, the number of tariff signals being in a determined ratio to the number of input pulses each representing a determined distance travelled or a determined waiting time. In accordance with the present invention the method comprises the steps of furnishing an added signal signifying a determined addend. It further comprises creating a sum signal by sequential addition of said addend signals, one in response to each of said input signals. In accordance with the present method, finally a carry signal is created whenever the so-created sum signal exceeds a predetermined sum signal signifying a predetermined number. The determined addend is computed as being equal to the ratio of $K/T$ where $K$ is said predetermined number and $T$ said determined ratio.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

A preferred embodiment of the present invention will now be described with reference to the drawings.

Figure 1:
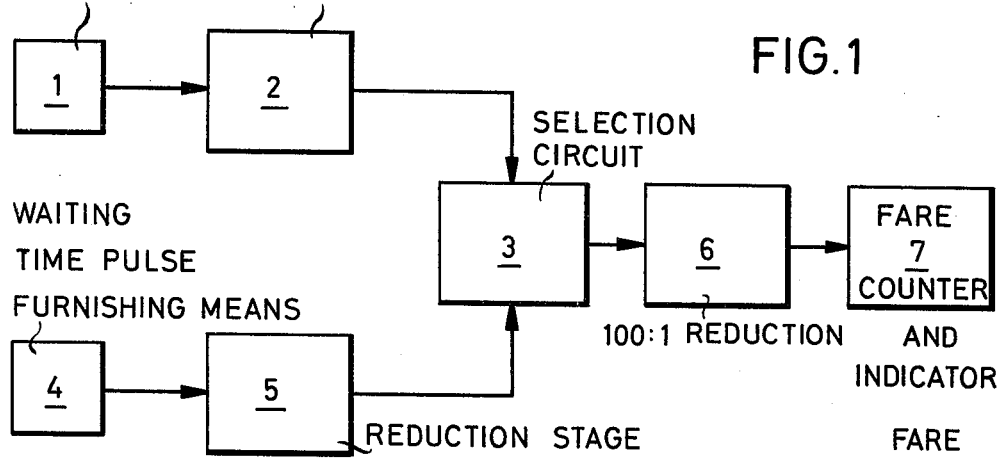
FIG. 1 is a block diagram showing the pulse reduction system and illustrating the pulse reduction method of the present invention.

In FIG. 1 reference numeral 1 refers to the means for furnishing a plurality of distance signals and specifically a plurality of distance pulses. The distance pulses are applied to a reduction stage 2, which furnishes a pulse sequence having a plurality of pulses reduced in number by the reduction ratio associated with stage 2 which of course is determined by the particular fare rate. Similarly pulses each indicating a unit of waiting time are furnished by unit 4 and applied to a similar reduction stage 5, at the output of which again is a plurality of pulses reduced in number by the reduction ratio associated with stage 5. The outputs of reduction stages 2 and 5 are connected to the inputs of selection circuit 3 at the output of which appears the pulse sequence having the faster repetition rate. A further 100:1 reduction then takes place in reduction stage 6 and the output pulses at the output of reduction stage 6 constitute the tariff pulses each of which causes the meter to be advanced by a given fare increment. These pulses are applied to fare counter 7 which, upon receipt of the pulse, advances the reading on the fare indicator by the determined fare increment.

Taking case II of the above Table as an example, the indicator is to be advanced by one fare increment after 150 distance pulses according to fare rate 1, after 125 distance pulses in accordance with fare rate 2 and after 100 distance pulses in accordance with fare rate 3. Taking into consideration that reduction stage 6 will effect a 100 to 1 reduction, then it is clear that reduction stage 2 must effect a reduction ratio of 1.5:1 for fare rate 1, 1.25:1 for fare rate 2 and 1:1 for fare rate 3. If it is now assumed that electronic components arranged on a binary decimal basis will be used, then reduction stage 2 could comprise adder means embodied in a counter which furnishes a carry signal after receipt of ten pulses. Alternately reduction stage 2 could be embodied in an adder which furnishes a carry signal after a sum equal to or exceeding 10 has been computed. In both cases the capacity of the adder means K=10. The desired ratio T at fare rate 1 is 1.5. Thus an addend, S=10/1.5 approximately ≈ 7 will result. Reduction stage 2 will then operate as follows:

TABLE I

A=Number of Distance Pulse B=Content of Counter or Adder
C=Number of Carry (Tariff) Pulses

| A | B | C | A | B | C |
|---|-----|----|----|------|-----|
| 1 | 7 | — | 9 | (6)3 | 6. |
| 2 | (1)4 | 1. | 10 | (7)0 | 7. |
| 3 | (2)1 | 2. | 11 | (7)7 | — |
| 4 | (2)8 | — | 12 | (8)4 | 8. |
| 5 | (3)5 | 3. | 13 | (9)1 | 9. |
| 6 | (4)2 | 4. | 14 | (9)8 | — |
| 7 | (4)9 | — | 15 | (10)5 | 10. |
| 8 | (5)6 | 5. | | | |

Examination of the above Table shows that for each 15 input (distance) pulses 10 carry (tariff) pulses result. Only the number in the units place of column B is stored in either the counter or the adder constituting reduction stage 5. It is this remainder which affects the result of the addition of the next addend and therefore increases the accuracy of the system and method of the present invention. Thus, when a large number of input pulses is taken into consideration a high degree of accuracy of the pulse reduction rate results. This method can be implemented very simply in known taxi meters as will be shown with reference to FIG. 2.

First, however, as an additional example the reduction ratio of 3.5:1 required for fare rate 2 of case I of the above Table will be considered. Using the formula $S=K/T$ results in an addend of S approximately ≈ 3. The resulting computation process in reduction stage 2 is then shown in tabular form as

TABLE II

A=Number of Distance Pulse B=Counter or Adder Content
C=Number of Carry (Tariff) Pulses

| A | B | C | A | B | C |
|----|------|----|----|-------|-----|
| 1 | 3 | — | 19 | (5)7 | — |
| 2 | 6 | — | 20 | (6)0 | 6. |
| 3 | 9 | — | 21 | (6)3 | — |
| 4 | (1)2 | 1. | 22 | (6)6 | — |
| 5 | (1)5 | — | 23 | (6)9 | — |
| 6 | (1)8 | — | 24 | (7)2 | 7. |
| 7 | (2)1 | 2. | 25 | (7)5 | — |
| 8 | (2)4 | — | 26 | (7)8 | — |
| 9 | (2)7 | — | 27 | (8)1 | 8. |
| 10 | (3)0 | 3. | 28 | (8)4 | — |
| 11 | (3)3 | — | 29 | (8)7 | — |
| 12 | (3)6 | — | 30 | (9)0 | 9. |
| 13 | (3)9 | — | 31 | (9)3 | — |
| 14 | (4)2 | 4. | 32 | (9)6 | — |
| 15 | (4)5 | — | 33 | (9)9 | — |
| 16 | (4)8 | — | 34 | (10)2 | 10. |
| 17 | (5)1 | 5. | 35 | (10)5 | — |
| 18 | (5)4 | — | | | |

The above Table also illustrates that this type of pulse reduction, when viewed over a sufficiently long time period results in very high accuracy. Whatever inaccuracies may exist at any one point are stored and taken into consideration upon receipt of the next-following pulse. Over a sufficiently long time period only relatively minor cumulative inaccuracies can thus occur.

The accuracy of the reduction ratio of course can be increased by increasing the capacity K of the adder means. For example this may be increased from 10 to either 100 or 1,000 as shown in the following example. Assume that $T_{desired} = 1.5:1$. Then for $K = 10$ and $S = 7$ $T_{actual} = 10/7 = 1.4285:1$
for $K = 100$ and $S = 67$ $T_{actual} = 100/67 = 1.4925:1$
for $K = 1,000$ and $S = 667$ $T_{actual} = 1,000/67 = 1.49925:1$ Of course the embodiment of the present invention utilizing adder means wherein K=10 is the simplest. Embodiments utilizing K=100 or K=1,000 require a greater amount of control circuitry so that if possible an embodiment utilizing K=10 should be used.

Figure 2:
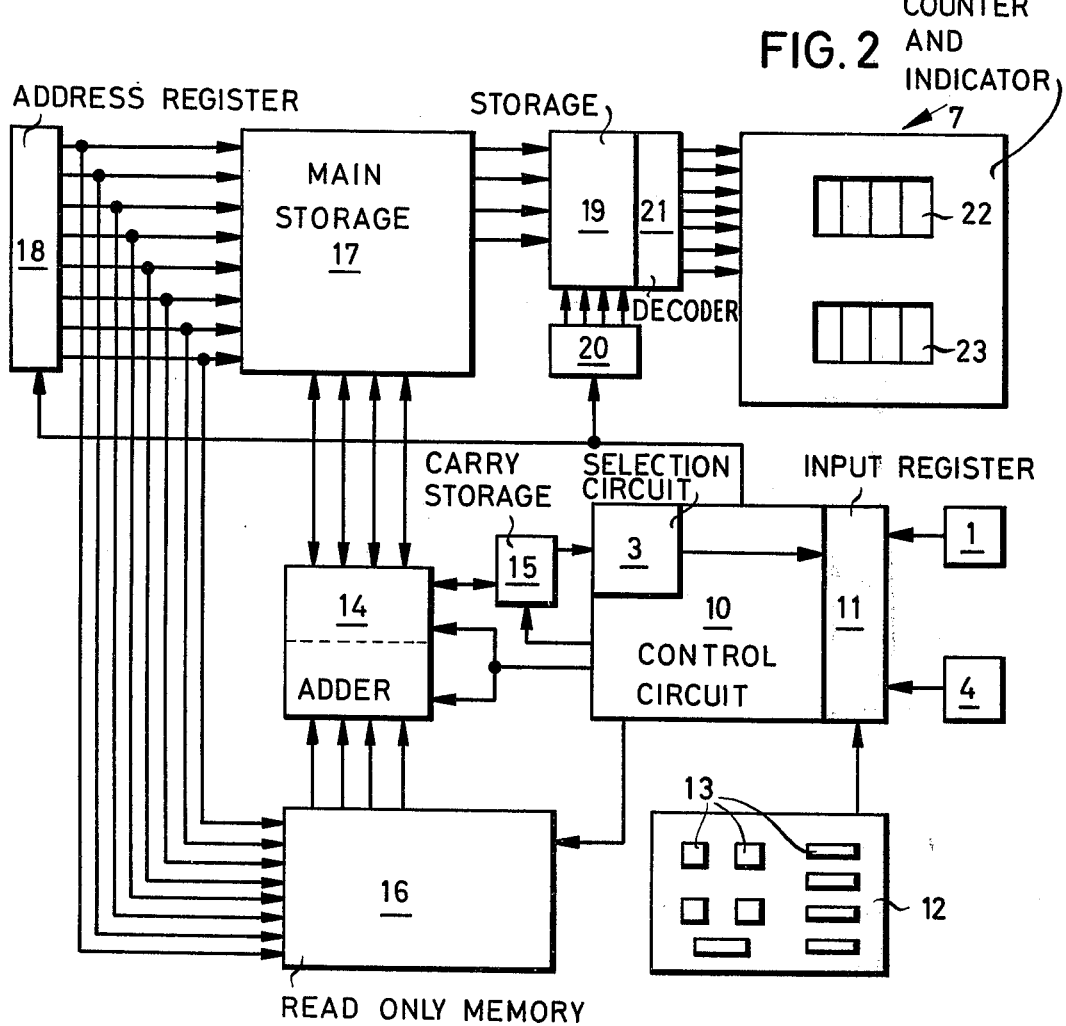
FIG. 2 is a schematic diagram of an electronic taxi meter including the circuitry of the present invention.

FIG. 2 is a schematic diagram of the circuitry of an electronic taxi meter wherein the present invention is incorporated. The taxi meter comprises the means for furnishing the distances pulses having reference numeral 1 and the means for furnishing the pulses each of which signify a unit waiting time and having reference numeral 4. Both pulse sequences are applied to a control circuit 10 which comprises an input register 11 and the selection circuit 3. The waiting time pulses and the distance pulses are both applied to input register 11. Input register 11 further receives function control signals from a keyboard 12 which has keys 13 which may be activated by the driver to indicate fare rate 1, fare rate 2, taxi unoccupied, taxi occupied, etc. The electronic taxi meter further had adder means 14 which cooperate with a carry storage 15. Adder 14 receives the values to be added to each other on the one hand from a main storage 17 and on the other hand from the addend furnishing means 16 which are referred to as constant furnishing means in the above-mentioned application and are embodied in a read only memory. Main storage 17 is addressed by an address register 18. Specifically, the eight output lines of address register 18 are activated in such a way that the 64 storage locations in storage 17 are addressed in a predetermined order. The values read out of storage 17 can be transferred to an intermediate storage 19 which is addressed by an address register 20. Under control of address register 20 values stored in intermediate storage 19 are transferred through a decoder 21 to the fare counter and indicator 7 which comprises indicator means 22 for indicating the actual fare to the customer and indicator means 23 for indicating any additional charges such as charges for suitcases, etc.

Main storage 17 has sufficient storage locations to store all values which are necessary for computing the fare and additional values which must be retained even after individual trips and which are used to compute further values such as the total number of kilometers that the taxi has travelled during a day, the total amount of extra charges, etc. The constant furnishing means which include the addend furnishing means of the present invention allow the taxi meter to be adjusted to whatever fare rate is in effect. It comprises storage locations for storing the values which are necessary for computing the fare under particular fare rates. This constant furnishing means may be a punched card or may be a printed circuit board. Various other embodiments are possible. In any case the constant furnishing means 16 of the taxi meter include the addend furnishing means, that is enough storage positions are provided in constant furnishing means 16 so that the addend S corresponding to each fare rate may be stored therein. Thus if case I is to be considered, at fare rate 1 the addend stored in a particular storage location will have the value 2, for fare rate 2, the addend will have the value of 3, for fare rate 3, the addend will have the value of 5. However, for case II, the constant furnishing means will furnish an addend having a value of 7 for fare rate 1, of 8 for fare rate 2 and 10 for fare rate 3. Storage locations in main storage means 17 will be used to store the unit values of the numbers listed in column B of Tables 1 and 2.

Let it now be assumed that the taxi meter is set for fare rate 1. The time and distance pulses are furnished by generators 1 and 4 to input register 11. Address registers 18 and 19 are controlled by control pulses from control circuit 10 in such a manner that the individual storage locations in the main storage 17 as well as the storage locations in intermediate storage 19 and the corresponding storage locations in the addend furnishing means 16 are addressed in sequence. If that storage location is addressed in main storage 17 which is assigned to the reduction of the distance pulses furnished by unit 1, in other words, which is assigned to function as reduction stage 2 of FIG. 1, then the values stored therein which correspond to the unit values of of column B in Table I, will be transferred to one part of adder 14. Simultaneously the corresponding storage location in the constant furnishing means 16 will be addressed. Thus the addend which is required for fare rate 1 and the distance pulse reduction will be transferred to the second portion of adder 14. If no carry pulse results from the addition of these two values adder 14 then the sum signal created in adder 14 is merely transferred back to the same storage location in storage 17. However, if a carry results, this is stored in carry storage 15 and from there is transferred to the selection circuit 3 by control circuit 10. The reduction of the number of pulses furnished by the unit 4 is carried out in a similar manner. Here too main storage 17 contains one or more storage locations to constitute part of the reduction storage 5 of FIG. 1. Again the storage locations serve to store the unit values of the figures given in column B of Tables I and II. The addend furnishing means constituting part of the read only memory 16 also have corresponding locations for storing the corresponding addend. Thus again adder 14 will receive a number corresponding to the unit value of the previously created sum signal from main storage 17 and an addend value corresponding to the correct addend for reducing the timing pulses at the correct fare rate from addend furnishing means 16. Carry signals created in adder 14 are stored in carry storage 15. The signals in carry storage 15 are of course supplied to a selection circuit 3 which selects from the two pulse sequences that pulse sequence having the highest repetition rate. The so-selected pulse sequence is again applied to input register 11 and from there, within one cycle of the operation of the taxi meter, is stored in main storage 17. At this storage location of storage 17 the value remains stored until such time as 100 pulses have been received. At this point storage 17 furnishes a pulse to advance the fare counter and indicator.

The above description of FIG. 2 has been given to show how the present invention can be incorporated into a known taxi meter. Details of the operation of the taxi meter may be found in the above-identified patent application. They do not constitute part of the present invention.

While the invention has been illustrated and described as embodied in pulse reduction stages, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a taxi meter, a method for creating a sequence of tariff signals each representing a determined fare increment in response to, and in a determined ratio with respect to a plurality of input pulses each representing a determined distance travelled or a determined waiting time, comprising, in combination, the steps of furnishing an addend signal signifying a determined addend; creating a sum signal by sequential additions of said addend signal, one in response to each of said input signals; and creating a carry signal whenever the so-created sum signal exceeds a sum signal signifying a predetermined number, said determined addend being substantially equal to the ratio of K/T where K is said predetermined number and T said determined ratio, said carry signals constituting said tariff signals.

2. In an electronic taxi meter, a system for creating tariff signals each representing a fare increment at a determined fate rate, comprising, in combination, input means for furnishing a sequence of input signals each representing a determined distance travelled or a determined unit of waiting time, the ratio of the number of said input signals to the desired corresponding number of said tariff signals having a value of T at said determined fare rate; adder means having an input and a determined capacity, for adding signals applied at said input, creating a sum signal corresponding to the sum of so-applied signals and furnishing a carry signal whenever said sum signal exceeds said determined capacity; and addend furnishing means connected to said input means and said adder means for furnishing an addend signal signifying an addend substantially equal to the ratio of K/T in response to each of said input signals, whereby said carry signals furnished by said adder means constitute said tariff signals.

3. A taxi meter as set forth in claim 2, wherein said input means comprises means for furnishing a sequence of first signals each representing a determined distance travelled and a sequence of second signals each representing a determined unit of waiting time; wherein the ratio of the number of said input signals to the desired corresponding number of said output signals for said sequence of first signals has a value of $T_1$ and for said second signals has a value of $T_2$; wherein said addend furnishing means comprise a read-only memory having storage locations for storing a first addend signal substantially equal to $K/T_1$ and a second addend signal substantially equal to $K/T_2$; wherein said taxi meter has a main storage having at least a first and second storage location for storing first and second sum signals corresponding to the sum of addends furnished under control of the distance and waiting time input signals respectively; wherein said system further comprises carry storage means connected to said adder means for storing first and second carry signals respectively associated with said first and second sum signals; wherein said taxi meter further comprises selection circuit means connected to said carry storage means for selecting the sequence of first carry signals or the sequence of second carry signals having the highest repetition rate to constitute said tariff signals; and wherein said taxi meter further comprises control circuit means connected to said main storage means, said adder means, said addend furnishing means, said input means and said carry storage means for controlling the transfer of sum signals from said main storage and said addend furnishing means to said adder means, the retransfer of the resulting sum signal from said adder means to said main storage means and the transfer of signals from said carry storage means to said selection circuit means.

* * * * *